United States Patent [19]

Craig

[11] Patent Number: 4,801,643

[45] Date of Patent: Jan. 31, 1989

[54] SMALL PARTICLE SIZE NON-SURFACE ACTIVE PROTECTIVE COLLOID-STABILIZED LATEXES DERIVED FROM MONOMERS OF HIGH AQUEOUS PHASE GRAFTING TENDENCIES

[75] Inventor: Daniel H. Craig, Mendenhall Village, Del.

[73] Assignee: Hercules Incorporated, Wilmington, Del.

[21] Appl. No.: 32,280

[22] Filed: Mar. 30, 1987

[51] Int. Cl.$^4$ .............. C08L 31/00; C08F 2/20; C08F 4/04
[52] U.S. Cl. .................... 524/832; 526/200; 526/201; 526/219.2
[58] Field of Search .......... 526/201, 219.2, 200; 524/832

[56] References Cited

U.S. PATENT DOCUMENTS

| | | | |
|---|---|---|---|
| 2,776,273 | 1/1957 | Richard | 526/219.2 |
| 3,513,120 | 5/1970 | Pohlemann et al. | 526/201 |
| 4,265,796 | 5/1981 | Mueller Mall et al. | 526/78 |
| 4,352,916 | 10/1982 | Fondoll | 526/200 |
| 4,492,780 | 1/1985 | Zimmerschied | 524/45 |

FOREIGN PATENT DOCUMENTS

| | | | |
|---|---|---|---|
| 51-61588 | 5/1976 | Japan | 526/219.2 |
| 55-9629 | 1/1980 | Japan | 526/219.2 |
| 1253450 | 10/1971 | United Kingdom | 526/201 |

OTHER PUBLICATIONS

Polymeric Material vol. 54 Craig pp. 370–374 Feb. 86 ACS.

*Primary Examiner*—Joseph L. Schofer
*Assistant Examiner*—Peter F. Kulkosky
*Attorney, Agent, or Firm*—Mark D. Kuller

[57] ABSTRACT

Disclosed are aqueous polyacrylate dispersions, i.e., aqueous latex dispersions of acrylate polymers, having improved rheological and stability characteristics, prepared by polymerization of acrylic esters, methacrylic esters and mixtures thereof in the presence of, by weight of the total monomer content, (a) from about 0.05 to about 5% of at least one non-surface active protective colloid, (b) from about 0.01 to 1% of at least one or more initiators selected from the group consisting of azo based initiators and organo-soluble, water-insoluble peroxide initiators, and (c) greater than 0.01% to about 0.05% of a water-soluble peroxide initiator. The resultant aqueous polyacrylate dispersions are useful in the manufacture of latex paints, binders for nonwoven materials, water-based inks, paper coatings and waterborne adhesives, such as pressure-sensitive adhesives.

21 Claims, No Drawings

SMALL PARTICLE SIZE NON-SURFACE ACTIVE PROTECTIVE COLLOID-STABILIZED LATEXES DERIVED FROM MONOMERS OF HIGH AQUEOUS PHASE GRAFTING TENDENCIES

This invention relates to aqueous polyacrylate dispersions, i.e., aqueous latex dispersions of acrylate polymers, having improved rheological and stability characteristics and processes for their preparation. The aqueous polyacrylate dispersions are useful in the manufacture of latex paints, binders for nonwoven materials, water-based inks, paper coatings and water-borne adhesives, such as pressure-sensitive adhesives.

Generally polyacrylate latices are produced by emulsion polymerization carried out in aqueous media. According to classical analysis, an emulsion polymerization is considered to contain a three-phase reaction system consisting of large droplets of the monomer (ca 1.5 micron diameter), an aqueous water phase containing a dissolved initiator, and colloidal particles of monomer-swollen polymer (usually 50–150 nm diameter). See, "Polymerization Mechanisms and Processes", 18 *Encyclopedia of Chemical Technology* pages 742–43 (John Wiley & Sons, Inc., 3rd Ed. 1982).

It is known that the presence of protective colloids, such as hydroxyethyl cellulose ("HEC") and polyvinyl alcohol, in the emulsion polymerization of acrylic esters, methacrylic esters or mixtures thereof together with more than about 50% vinyl acetate, by weight of the total monomer, provides latices having good mechanical stability and viscosity control. However, when the vinyl acetate comonomer is not used or is used in amounts less than 50%, a stable latex cannot be obtained if the protective colloid is present.

Further, it is known that the presence of protective colloids during the manufacture of polyacrylate dispersions or latices from reaction mixtures having a high acrylate or methacrylate content usually results either in coagulated dispersions or in extremely viscous dispersions which are unsuitable for use as paint binders or any other use.

Thus, in order to provide acrylic latices having the improved stability and rheology which results from the successful incorporation of protective colloids during the emulsion polymerization of acrylic or methacrylic monomers, a number of methods have been developed. For example, British Pat. No. 1,278,813 discloses the use of emulsion stabilizers, such as allyl alcohols, allyl halides and low molecular weight aliphatic alcohols; whereas U.S. Pat. No. 4,265,796 teaches the use of molecular weight regulators, such as mercaptoacetic acid and cyclohexylamine, to permit the inclusion of protective colloids in the manufacture of polyacrylate dispersions. U.S. Pat. No. 4,659,771 Craig and U.S. patent application Ser. No. 880,932 Craig (allowed November 26 1986) and 768,273 Craig (allowed Jan. 9, 1987) teach that protective colloids can be incorporated into polyacrylate dispersions by carrying out emulsion polymerization in the presence of small amounts of water-soluble monomers having conjugated unsaturation such as furoic acid, styrene sulfonic acid, etc., and small amounts of water-soluble amino alcohols such as mono, di, and trialkoxylated aliphatic amines, alkoxylated fatty amines, etc., respectively. These methods are all disadvantageous in that they entail use of additives and a method of producing a polymer latice by polymerization of acrylic or methacrylic monomers wherein protective colloids are used without use of such additives has been desired.

Other processes provide for the gradual addition of the protective colloid during the polymerization reaction (see, e.g., U.S. Pat. No. 3,876,596). The resultant latices, however, have a high viscosity, coarse particle size and poor processing characteristics.

High levels of surfactants, e.g., about 5% to about 10%, based on the monomer, in place of the protective colloid have also been used to obviate the problems associated with the emulsion polymerization of acrylic esters and methacrylic esters in the presence of a protective colloid. However, the properties of the resultant latex, such as its film-forming ability, tensile strength, film-blocking resistance and water and solvent resistance are adversely affected.

This invention provides a method for successfully incorporating the protective colloid into acrylic ester and methacrylic ester latices without agglomeration which method does not require the presence of emulsion stabilizers, molecular weight regulators or high surfactant levels and may be used to prepare latices with small particle sizes, e.g., less than 0.2 micron (weight average particle diameter), and superior mechanical stability. The polyacrylate dispersions of this invention are low viscosity, shear stable, essentially grit free and reproducible. Latex paints formulated with the dispersions of this invention exhibit good abrasion resistance.

In accordance with this invention, it has been found that protective colloids are readily and successfully incorporated into polyacrylate dispersions, i.e., aqueous dispersions of polyacrylate polymer latices, by the polymerization of acrylic esters, methacrylic esters and mixtures thereof in the presence of, by weight of total monomer content, (a) from about 0.05 to about 5% of at least one non-surface active protective colloid, (b) from about 0.01 to about 1% of at least one initiator selected from the group consisting of azo initiators and organo-soluble, water-insoluble peroxide initiators, and (c) greater than 0.01% to about 0.05% of a water-soluble peroxide initiator.

Acrylic esters and methacrylic esters suitable for use in the practice of this invention include alkyl acrylates and methacrylates wherein the alkyl group contains less than 22 carbon atoms. Preferably at least 50%, by weight, of the total monomers are monomers selected from the group consisting of alkyl acrylates and methacrylates having less than 10 carbon atoms. Typical acrylic esters and methacrylic esters include methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, 2-ethylhexyl acrylate, 2-ethylhexyl methacrylate, t-butyl acrylate, t-butyl methacrylate, 3,3-dimethylbutyl acrylate and 3,3-dimethyl butyl methacrylate. Suitable $C_{10\text{-}22}$ alkyl esters of acrylic and methacrylic acid include decyl acrylate, decyl methacrylate, hendecanyl methacrylate, lauryl methacrylate, tridecanyl methacrylate, myristyl acrylate, myristyl methacrylate, pentadecanyl methacrylate, arachidyl methacrylate, behenyl methacrylate, 10-methyl hendecanyl methacrylate and 2-ethyl-lauryl methacrylate. These monomers can be homopolymerized or copolymerized with each other.

In addition to being copolymerized with each other, the aforementioned acrylates and methacrylates can be copolymerized with other types of olefinically unsaturated monomers capable of addition type polymerization, including unsubstituted and substituted styrene, such as alpha-methylstyrene, acrylic or methacrylic acid, vinyl and vinylidene halides, allyl esters of saturated monocarboxylic acids, vinyl esters, vinyl ethers, vinyl ketones, dialkyl esters of monoethylenically unsaturated dicarboxylic acids, amine containing ethylenically unsaturated monomers, ethylenically unsaturated monocarboxylic and polycarboxylic acids and the anhydrides, nitriles, unsubstituted and substituted (including N-substituted) amides of all said acids.

Suitable vinyl and vinylidene halides include vinyl chloride, vinylidene chloride, 2-cloropropene, and 3,3,3 trichloro-2-chloropropene.

Suitable vinyl esters include aliphatic vinyl esters, such as vinyl formate, vinyl acetate, vinyl propionate, vinyl butyrate, vinyl isobutyrate, vinyl valerate, and vinyl caproate, and suitable allyl esters include allyl esters of saturated monocarboxylic acids, such as, allyl acetate, allyl propionate and ally lactate. Although these monomers may be used in the general ranges described below, they are generally used in amounts ranging up to about 10% by weight of the total weight of monomers used. The allyl esters of saturated monocarboxylic acids are generally used in relatively small amounts together with larger amounts of one or more different vinyl monomers, particularly with aliphatic vinyl esters such as vinyl acetate.

Typical vinyl ethers include methylvinyl ether, ethylvinyl ether and n-butylvinyl ether and typical vinyl ketones include methylvinyl ketone, ethylvinyl ketone and iso-butylvinyl ketone. Suitable dialkyl esters of monoethylenically unsaturated dicarboxylic acids include diethyl maleate, dibutyl maleate, dioctyl maleate, diisooctyl maleate, dinonyl maleate, diisodecyl maleate, ditridecyl maleaee, dipropyl fumarate, dibutyl fumarate, dioctyl fumarate, diisooctyl fumarate, didecyl fumarate, dibutyl itaconate and dioctyl itaconate.

Monoethylenically unsaturated monocarboxylic acids, such as acrylic acid, methacrylic acid, ethacrylic acid and crotonic acid; monoethylenically unsaturated dicarboxylic acids, such as maleic acid, fumaric acid, itaconic acid and citraconic acid; and monoethylenically unsaturated tricarboxylic acids, such as aconitic acid and the halogen-substituted derivatives, e.g., alpha-chloroacrylic acid, and anhydrides of these acids, such as, e.g., maleic anhydride and citraconic anhydride are suitable for use as comonomers in the practice of this invention.

Acrylonitrile, alpha-chloro-acrylonitrile and methacrylonitrile are among the corresponding nitriles of such acids which can be used as comonomers. Suitable amides of such acids include unsubstituted amides such as acrylamide, methacrylamide and other alpha-substituted acrylamides and N-substituted amides obtained by conventional reaction of the amides of the aforementioned mono- and poly-carboxylic acids with an aldehyde, such as formaldehyde. Typical N-substituted amides include N-methylolacrylamide, N-methylolmethacrylamide, alkylated N-methylolacrylamides and N-methylolmethylmethacrylamide.

Amine containing ethylenically unsaturated monomers which can be used in the practice of this invention include substituted and unsubstituted aminoalkyl acrylates, hydrochloride salts of amino monomers and methacrylates, such as beta-aminoethylacrylate, beta-aminoethylmethacrylate, beta-dimethylaminoethylacrylate, beta-dimethylaminoethylmethacrylate. Typical hydroxy-containing monomers include beta-hydroxyethylacrylate, beta-hydroxypropylacrylate, gamma-hydroxypropylacrylate and beta-hydroxyethylmethacrylate.

Styrene, styrene derivatives, and acrylonitrile comonomers can be present in amounts greater than 50%, for example, in amounts up to about 75%. However, the comonomer is typically present in an amount from about 0.5% to less than 50%, by weight of the total monomer content, preferably from about 0.5% to about 25%, most preferably from about 1% to about 10%.

Non-surface active protective colloids useful in this invention include all water-soluble protective colloids which do not significantly lower the surface tension of water when present at 0.1%, based on the total weight of the solution Typical non-surface active protective colloids include HEC, carboxymethyl hydroxyethyl cellulose, carboxymethyl cellulose (sodium and other salts), ethoxylated starch derivatives, water-soluble starch, water-soluble alginates such as sodium or potassium alginate, and gum arabic. Preferred protective colloids are water-soluble starch, HEC and sodium carboxymethyl cellulose.

Although the amount of non-surface active protective colloid used will vary depending on the desired viscosity, particle size and latex properties, generally from about 0.05 to about 5%, by weight of the total monomer content, is employed, preferably from about 0.2% to about 1%.

Surface active protective colloids, such as hydrophobically modified hydroxyethyl cellulose, polyvinyl alcohol and polyvinylpyrrolidone, may also be present during polymerization so long as they are not used in an amount that in combination with the non-surface active protective colloid will lower the surface tension of water below about 65 dynes/cm at 0.1% concentration by weight, based on the weight of the total solution. Typically, they are present in an amount less than or equal to about 0.1%, by weight, of the total monomer content.

The free radical polymerization initiators useful in this invention are azo initiators, including organo-soluble and water-soluble azo initiators such as azobis isobutyronitrile and azobis cyanovaleric acid dipotassium salt or azobis isobutyramidine dihydrochloride, respectively, and organo-soluble, water-insoluble peroxide initiators such as benzoyl peroxide and lauroyl peroxide. The solubility of organo-soluble, water-insoluble peroxide initiators per this invention is less than about 0.1% (based on the aqueous phase) soluble in water in the presence of the above monomers.

In order to produce a latex with suitable mechanical stability in the presence of non-surface active protective colloids, it is necessary to carry out polymerization in the presence of a relatively small amount of water-soluble peroxide initiator such as hydrogen peroxide, persulfate salts, etc. Typically, polymerization is carried out in the presence of one or more of these polymers in the aforementioned amounts. Preferably about 0.02 to about 0.04%, most preferably 0.025 to 0.03%, by weight, of the total monomer content, are used.

Anionic, cationic, nonionic and amphoteric emulsifiers and mixtures thereof known in the art may be used in the practice of this invention, but are not necessary for the successful use of this invention. Suitable emulsifiers include polyglycol ethers, sulfonated paraffin hydrocarbons, higher alkyl sulfates such as lauryl sulfate, alkali metal salts of fatty acids such as sodium stearate and sodium oleate, sulfuric acid esters of fatty alcohols, ethoxylated $C_{4-12}$ alkyl phenols and their sulfonation products and also sulfosuccinic acid esters in amounts usually of from 0.1 to 5.0% by weight based on the total weight of the monomers.

Although this invention cannot be considered to be strictly limited to "emulsion polymerization" since organosoluble initiators can be used, by definition emulsion polymerization requires the presence of a water-soluble initiator, and the polymerization mechanisms by which polymerization takes place are not fully understood, nevertheless the process of polymerization of this invention can be carried out using any of the known methods of emulsion polymerization including batch, semi-batch, continuous, thermal, or redox processes with batch, semi-batch or continuous addition of any of the aforementioned ingredients in any combination so long as the constraints mentioned above on the ingredients, in particular the initiator, are maintained.

The invention is illustrated in the following examples, which are exemplary and not intended to be limiting, wherein all parts, percentages, etc., are by weight and weight percentages are based on the total latex weight, unless otherwise indicated (All parts and percentages used in this specification are by weight unless otherwise indicated).

EXAMPLE 1 (COMPARISON)

This comparative example illustrates polymerization in the presence of HEC as non-surface active protective colloid and a water-soluble azo initiator (without a water-soluble peroxide).

A reaction vessel equipped with a stirrer, reflux condenser, thermometer, two feed ports, a nitrogen inlet and a water jacket was charged with 48.65 parts distilled water, 1.15 part nonylphenol ethoxylate mixed phosphate ester containing 9 moles of ethylene oxide surfactant, 0.2 parts hydroxyethyl cellulose having a Brookfield viscosity of 93 cps in a 5% aqueous solution at 25° C. and a hydroxyethyl molar substitution of 2.5, under a nitrogen blanket. Stirring was continuous throughout the reaction. The temperature of the reactor was raised to 85° C., via circulating hot water, at which time 6.0 parts of a 1% solution of 4,4'azobis(4-cyanovaleric acid) dipotassium salt and 44.0 parts of a monomer mixture comprising, by weight, 42.7% butyl acrylate, 56.8% methyl methacrylate, and 0.5% methacrylic acid were added separately, but concurrently, in a slow but continuous fashion over a 3 hour period. The reaction temperature was maintained at 85° C. for 1 hour after the addition of the two continuous feeds at which time the reaction mixture was cooled to room temperature, filtered through cheese cloth, and characterized.

EXAMPLE 2 (COMPARISON)

This comparative example illustrates polymerization in the presence of an organo-soluble azo initiator (without a water-soluble peroxide).

The procedure and formulation of Example 1 were used except that the initiator was 0.05 part of azobis isobutyronitrile which was dissolved in the monomer feed, and the mixed phosphate ester surfactant was replaced by 2.3 parts Aerosol A-102 surfactant (Aerosol is a trademark of American Cyanamid for ethoxylated alcohol half ester of disodium salt of sulfosuccinic acid and 0.7 part octylphenol ethoxylate surfactant containing 10 moles of ethylene oxide.

EXAMPLE 3 (COMPARISON)

This comparative example illustrates polymerization in the presence of an organo-soluble peroxide initiator (without a water-soluble peroxide).

The procedure and formulation of Example 2 were used except that azobis isobutyronitrile was replaced by 0.1 part benzoyl peroxide.

EXAMPLE 4 (COMPARISON)

This comparative example illustrates polymerization with a styrene comonomer and a water-soluble azo initiator.

The procedure and formulation of Example 1 were used except that the acrylic monomer mixture was replaced with a 50/50/1 (parts by weight) mixture of styrene/methacrylate/methacrylic acid at the same concentration.

EXAMPLE 5 (INVENTION)

This example illustrates polymerization, per this invention, in the presence of a combination of a water-soluble azo initiator and potassium persulfate.

The procedure and formulation of Example 1 were used except that 0.035 part potassium persulfate was mixed with the 6.0 parts of aqueous solution containing 1% 4,4'azobis(4-cyanovaleric acid) dipotassium salt.

EXAMPLE 6 (INVENTION)

This example illustrates polymerization, per this invention, in the presence of a combination of organo-soluble azo initiator and potassium persulfate.

The procedure and formulation of Example 5 were used except that 4-4'-azobis(cyanovaleric acid) dipotassium salt was replaced by 0.05 parts azobis isobutyronitrile, which was dissolved in the monomer before addition.

EXAMPLE 7 (INVENTION)

This example illustrates polymerization, per this invention, in the presence of a combination of an organosoluble peroxide initiator and potassium persulfate.

The procedure and formulation of Example 6 were used except that azobis isobutyronitrile was replaced by 0.1 part benzoyl peroxide.

EXAMPLE 8 (COMPARISON)

This is a comparative example which illustrates use of an organo-soluble azo initiator in vinyl acetate copolymer latex manufacture.

The procedure and formulation of Example 2 were used except that the acrylic monomer mixture was replaced by a mixture of 85 parts vinyl acetate and 15 parts butyl acrylate, and 1.15 parts of the surfactant of Example 1 was used in place of the 2.3 parts Aerosol A-102 and 0.7 part octylphenol ethoxylate-10.

EXAMPLE 9 (COMPARISON)

This is a comparative example illustrating emulsion polymerization in the presence of a water-soluble peroxide initiator alone.

The procedure and formulation of Example 1 were used except that the azobis cyanovaleric acid dipotassium salt was replaced by 6.0 parts of 2% potassium persulfate.

EXAMPLE 10 (COMPARISON)

This is a comparative example showing polymerization without a protective colloid.

The procedure and formulation of Example 2 were carried out, except that hydroxyethyl cellulose was omitted completely.

EXAMPLE 11 (COMPARISON)

This is a comparative example showing polymerization without a protective colloid.

The procedure and formulation of Example 1 were used except that hydroxyethyl cellulose was omitted completely.

The resulting polymer dispersions were evaluated and the results are shown in the following Table.

TABLE

Latex Data

| Example | pH | Solids wt. % | Viscosity cps[1] | Particle Size[2] microns | Particle Size After Mechanical Shear[5] microns |
|---|---|---|---|---|---|
| 1(Comparison) | 5.1 | 48 | 6,400 | 0.10 | 0.28 |
| 2(Comparison) | 5.1 | 46 | 265 | 0.10 | 0.32 |
| 3(Comparison) | 4.2 | 42 | 370 | 0.15 | 0.35 |
| 4(Comparison) | 5.1 | 48 | 385 | 0.12 | 0.22 |
| 5(Invention) | 4.7 | 48 | 120 | 0.16 | 0.20 |
| 6(Invention) | 4.7 | 48 | 135 | 0.17 | 0.21 |
| 7(Invention) | 4.6 | 46 | 156 | 0.18 | 0.20 |
| 8(Comparison) | 3.1 | 42[3] | 6,800 | 0.10 | 0.55 |
| 9(Comparison) | 2.8 | 32[4] | >20,000 | >4.0 | — |
| 10(Comparison) | 5.1 | 46 | 122 | 0.10 | 0.33 |
| 11(Comparison) | 5.3 | 48 | 11,200 | 0.10 | 0.30 |

[1]Brookfield LVT viscosity at 25° C.
[2]Coulter Nanosizer (weight average particle diameter).
[3]Lower solids due to filtration and removal of coagulum.
[4]Coagulation of latex during manufacture prevented full addition of monomer.
[5]Ten minutes in a Waring Blender at its highest setting.

All of the samples, except the comparative sample produced in Example 9, had particle sizes of 0.20 micron or less which is desirable for use in many applications. In fact, it is somewhat surprising that emulsions with such small particle sizes resulted as polyacrylate polymers produced by emulsion polymerization techniques in the presence of protective colloids typically have particle sizes greater than 0.2 micron. Particles sizes greater than 1 micron are undesirable and, therefore, the dispersion produced in Example 9, using a water-soluble peroxide initiator was not suitable for most purposes, in particular, for use in latex paint frrmulations. All of the dispersions had suitable viscosity for use in latex paints.

All of the dispersions were examined using transmission electron microscopy to determine whether agglomeration occurred. All of the samples, except that of comparative Example 9, were found to have no agglomeration. The sample produced in Example 9 agglomerated.

Mechanical stability was evaluated by comparing particle size before and after application of shear. The above data show that latices polymerized per this invention have superior mechanical stability over all of the comparison samples, as illustrated by their relatively small increase in average particle diameter as compared to that of the comparative samples.

The rheological properties of the samples were also compared, by observing their properties when hand mixed. The dispersions of this invention exhibited the improved rheological properties (i.e., less pseudoplasticity) generally attributed to use of protective colloids.

Aqueous dispersions of this invention are protective colloid containing polyacrylate latex polymer dispersions having improved rheological properties which have less tendency to agglomerate and greater mechanical stability than polyacrylate emulsions prepared by conventional emulsions polymerization techniques in the presence of protective colloids. Polymer latices of this invention have particle sizes less than about 1 micron, in fact, in many instances smaller than 0.2 micron, and are useful in the manufacture of latex paints, binders for nonwoven materials, water-based inks, paper coatings and water-borne adhesives, such as pressure-sensitive adhesives.

While the invention has been described with respect to specific embodiments, it should be understood that they are not intended to be limiting and that many variations and modifications are possible without departing from the scope of this invention.

I claim:

1. A process of preparing an aqueous polyacrylate dispersion having improved mechanical stability comprising aqueous polymerization of acrylic esters, methacrylic esters and mixtures thereof in the presence of, by weight of total monomer content, (a) from about 0.05 to about 5% of at least one non-surface active protective colloid, (b) from about 0.01 to about 1% of at least one initiator selected from the group consisting of azo initiators and organosoluble, water-insoluble peroxide initiators, and (c) greater than 0.01% to about 0.05% of at least one water-soluble peroxide initiator, wherein the polyacrylate dispersed as a result of the process has a particle size less than about 1 micron.

2. The process of claim 1 wherein the at least one initiator (b) is selected from the group consisting of azo initiators.

3. The process of claim 2 wherein the azo initiators are water soluble.

4. The process of claim 2 wherein the azo initiators are organo soluble.

5. The process of claim 1 wherein the at least one initiator (b) is selected from the group consisting of water-insoluble peroxide initiators.

6. The process of claim 1 wherein the acrylic esters and methacrylic esters are selected from the group consisting of alkyl acrylates and methacrylates wherein the alkyl group contains less than 22 carbon atoms.

7. The process of claim 1 wherein at least 50%, by weight, of the total monomers are monomers selected from the group consisting of alkyl acrylates and methacrylates having less than 10 carbon atoms.

8. The process of claim 1 wherein the acrylic esters, methacrylic esters and mixtures thereof are copolymerized with one or more monomers capable of addition polymerization.

9. The process of claim 8 wherein the monomers capable of addition polymerization are selected from the group consisting of unsubstituted and substituted styrene, acrylic or methacrylic acid, vinyl and vinylidene halides, allyl esters of saturated monocarboxylic acids, vinyl esters, vinyl ethers, vinyl ketones, dialkyl esters of.monoethylenically unsaturated dicarboxylic acids, amine containing ethylenically unsaturated monomers, ethylenically unsaturated monocarboxylic and polycarboxylic acids and the anhydrides, nitriles, unsubstituted and substituted amides of all said acids.

10. The process of claim 9 wherein the monomers capable of addition polymerization are present in an amount from about 0.5% to less than 50%, by weight of the total monomer content.

11. The process of claim 10 wherein the monomers capable of addition polymerization are present in an amount from about 0.5% to about 25%, by weight of the total monomer content.

12. The process of claim 11 wherein the monomers capable of addition polymerization are present in an amount from about 1% to about 10%, by weight of the total monomer content.

13. The process of claim 1 wherein the non-surface active protective colloid is selected from the group consisting of hydroxyethyl cellulose, carboxymethyl hydroxyethyl cellulose, carboxymethyl cellulose, ethoxylated starch derivatives, water-soluble starch, water-soluble alginates and gum arabic.

14. The process of claim 13 wherein the protective colloid is selected from the group consisting of hydroxyethyl cellulose, sodium carboxymethyl cellulose and water-soluble starch.

15. The process of claim 1 wherein the at least one initiator (b) is selected from the group consisting of azobis isobutyronitrile, azobis cyanovaleric acid dipotassium salt, azobis isobutyramidine dihydrochloride, benzoyl peroxide and lauroyl peroxide.

16. The process of claim 1 wherein the water-soluble peroxide initiator is selected from the group consisting of hydrogen peroxide and persulfate salt.

17. The process of claim 1 wherein the at least one water-soluble peroxide initiator is contained in an amount of about 0.02 to about 0.04%, by weight, of the total monomer content.

18. The process of claim 1 wherein the polymerization is carried out in the absence of emulsifiers.

19. A process of preparing an aqueous polyacrylate dispersion having improved mechanical stability comprising aqueous polymerization of acrylic esters, methacrylic esters and mixtures thereof in the presence of, by weight of total monomer content, (a) from about 0.05 to about 5% of at least one non-surface active protective colloid selected from the group consisting of hydroxyethyl cellulose, carboxymethyl hydroxyethyl cellulose, carboxymethyl cellulose, ethoxylated starch derivatives, water-soluble starch, water-soluble alginates and gum arabic, (b) from about 0.01 to about 1% of an initiator selected from the group consisting of azobis isobutyronitrile, azobis cyanovaleric acid dipotassium salt, azobis isobutyramidine dihydrochloride, benzoyl peroxide and lauroyl peroxide, and (c) greater than 0.01% to about 0.05% of a water-soluble peroxide initiator selected from the group consisting of hydrogen peroxide and persulfate salt, wherein the acrylic esters and methacrylic esters are selected from the group consisting of alkyl acrylates and methacrylates wherein the alkyl group contains less than 22 carbon atoms and at least 50%, by weight, of the total monomers are monomers selected from the group consisting of alkyl acrylates and methacrylates, having less than 10 carbon atoms, wherein the polyacrylate dispersed as a result of the process has a particle size less than about 1 micron.

20. The process of claim 1 wherein at least one water-soluble peroxide initiator is contained in an amount of about 0.025 to 0.03%, by weight, of the total monomer content.

21. The process of claim 1 wherein the particle size is less than 0.2 micron.

* * * * *

UNITED STATES PATENT AND TRADEMARK OFFICE
CERTIFICATE OF CORRECTION

PATENT NO. : 4,801,643                                    Page 1 of 2

DATED      : JANUARY 31, 1989

INVENTOR(S) : CRAIG

It is certified that error appears in the above-identified patent and that said Letters Patent is hereby corrected as shown below:

[56] References Cited

"4,352,916  10/1982  Fondoll .........................526/200" should read
--4,352,916  10/1982  Landoll .........................526/200--

Column 1, Line 56

"880,932 Craig (allowed November 26 1986) and"  please delete

Column 3, Line 35

"maleaee"  should read  --maleate--

Column 4, Line 15

"solution "  should read  --solution.--

Column 7, Line 50

"frrmulations"  should read  --formulations--

Column 8, Line 64

UNITED STATES PATENT AND TRADEMARK OFFICE
CERTIFICATE OF CORRECTION

PATENT NO. : 4,801,643
DATED : JANUARY 31, 1989
INVENTOR(S) : CRAIG

It is certified that error appears in the above-identified patent and that said Letters Patent is hereby corrected as shown below:

Column 8, Line 64

"of.monoethylenically" should read --of monoethylenically--.

Signed and Sealed this

Eleventh Day of July, 1989

Attest:

DONALD J. QUIGG

Attesting Officer     Commissioner of Patents and Trademarks